(12) United States Patent
Kirihara

(10) Patent No.: US 9,142,183 B2
(45) Date of Patent: Sep. 22, 2015

(54) DISPLAY MANAGEMENT SYSTEM

(75) Inventor: Satoshi Kirihara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 379 days.

(21) Appl. No.: 13/540,222

(22) Filed: Jul. 2, 2012

(65) Prior Publication Data

US 2013/0016031 A1   Jan. 17, 2013

(30) Foreign Application Priority Data

Jul. 15, 2011   (JP) ................. 2011-156604

(51) Int. Cl.
| | |
|---|---|
| *G06F 15/16* | (2006.01) |
| *G09G 5/00* | (2006.01) |
| *G06F 3/14* | (2006.01) |

(52) U.S. Cl.
CPC .. *G09G 5/00* (2013.01); *G06F 3/14* (2013.01); *G09G 2370/022* (2013.01); *G09G 2370/042* (2013.01)

(58) Field of Classification Search
CPC ............... G06F 3/14; G09G 2370/022; G09G 2370/042
USPC ................................. 345/504, 520
See application file for complete search history.

(56) References Cited

U.S. PATENT DOCUMENTS 7,126,704 B2 * 10/2006 Miura et al. ................. 358/1.14
7,814,416 B2 * 10/2010 Shinkai ......................... 715/255

FOREIGN PATENT DOCUMENTS

| | | |
|---|---|---|
| JP | 2005-167678 | 6/2005 |
| JP | 2010-028658 | 2/2010 |

* cited by examiner

*Primary Examiner* — Hau Nguyen
(74) *Attorney, Agent, or Firm* — Cowan, Liebowitz & Latman, P.C.

(57) ABSTRACT

The display management system includes an operation display apparatus, a master display apparatus, and a management server. The management server has a selection unit that causes the user to select image processing that is executed by the master display apparatus when the image edited by the user by using the operation display apparatus is checked using the master display apparatus, and an instruction unit that instructs the operation display apparatus to execute the image processing selected by the selection unit in a case where this image processing can be executed by the operation display apparatus. The operation display apparatus has an image processing unit that subjects the inputted image to the image processing performed under instruction by the instruction unit and a display unit that displays on a display unit the image subjected to the image processing by the image processing unit.

18 Claims, 10 Drawing Sheets

FIG. 2

| EMULATION MODE | USED UNIQUE FUNCTION | ID |
|---|---|---|
| C COMPANY PROJECTOR MODE | FRC | FRC004 |
| | BLACK INSERTION | K001 |
| | LOCAL DIMMING | LD005 |
| | DYNAMIC GAMMA | DG001 |
| | MEMORY COLOR CORRECTION | KH001 |
| | ENHANCER | E001 |
| P COMPANY TELEVISION MODE | FRC | FRC006 |
| | BLACK INSERTION | K002 |
| | LOCAL DIMMING | LD004 |
| | DYNAMIC GAMMA | DG002 |
| | MEMORY COLOR CORRECTION | KH002 |
| | ENHANCER | E002 |

FIG. 3

| OWN UNIQUE FUNCTION | USABLE ID |
|---|---|
| FRC | FRC003, FRC001, FRC005, FRC006 |
| BLACK INSERTION | K002, K003, K004 |
| MEMORY COLOR CORRECTION | KH001 |
| ENHANCER | E001 |

FIG. 4

PLEASE, INPUT THE JOB NAME

PLEASE, SELECT THE EMULATION MODE THAT WILL BE USED

○ C COMPANY PROJECTOR MODE

○ P COMPANY TELEVISION SET MODE

FIG. 5

PLEASE, INPUT THE PROCESS NAME

PLEASE, SELECT THE FUNCTION THAT WILL BE USED
(MULTIPLE FUNCTIONS CAN BE SELECTED)

○ FRC

○ BLACK INSERTION

○ LOCAL DIMMING

○ DYNAMIC GAMMA

○ MEMORY COLOR CORRECTION

○ ENHANCER

FIG. 6

| JOB | EMULATION MODE | PROCESS | UNIQUE FUNCTION THAT WILL BE USED | ID |
|---|---|---|---|---|
| MOVIE PRODUCTION FOR "A" COMPANY | C COMPANY PROJECTOR MODE | PRE-COLOR GRADING | LOCAL DIMMING | LD005 |
| | | | MEMORY COLOR CORRECTION | KH001 |
| | | STATIONARY SCENE SYNTHESIS | LOCAL DIMMING | LD005 |
| | | | MEMORY COLOR CORRECTION | KH001 |
| | | | ENHANCER | E001 |
| | | DYNAMIC SCENE SYNTHESIS | FRC | FRC004 |
| | | | BLACK INSERTION | K002 |
| | | | LOCAL DIMMING | LD005 |
| | | | DYNAMIC GAMMA | DG001 |
| | | | MEMORY COLOR CORRECTION | KH001 |
| | | | ENHANCER | E001 |
| | | SUBTITLE SYNTHESIS | ENHANCER | E001 |
| | | POST-COLOR GRADING | FRC | FRC004 |
| | | | BLACK INSERTION | K002 |
| | | | LOCAL DIMMING | LD005 |
| | | | DYNAMIC GAMMA | DG001 |
| | | | MEMORY COLOR CORRECTION | KH001 |
| | | | ENHANCER | E001 |

FIG. 7

| NAME OF UNIQUE FUNCTION | ID | USABLE ID |
|---|---|---|
| FRC | FRC001 | FRC002,FRC003 |
| | FRC002 | FRC001 |
| | FRC003 | FRC001 |
| | FRC004 | FRC005 |
| | FRC005 | FRC004 |
| | FRC006 | FRC008 |
| | FRC007 | |
| | FRC008 | FRC006, FRC009 |
| | FRC009 | FRC008 |
| | FRC010 | |
| BLACK INSERTION | K001 | K002,K003 |
| | K002 | K001 |
| | K003 | K003 |
| | K004 | |
| | K005 | |
| LOCAL DIMMING | LD001 | LD003 |
| | LD002 | |
| | LD003 | LD001 |
| | LD004 | LD005 |
| | LD005 | LD004 |
| DYNAMIC GAMMA | DG001 | |
| | DG002 | DG003 |
| | DG003 | DG002 |
| MEMORY COLOR CORRECTION | KH001 | |
| | KH002 | |
| ENHANCER | E001 | |
| | E002 | |

DISPLAY MANAGEMENT SYSTEM

BACKGROUND OF THE INVENTION

1. Field of the Invention

The present invention relates to a display management system.

2. Description of the Related Art

The performance of display apparatuses that input and display images (referred to hereinbelow as "displays") has recently improved and functionality of displays has increased accordingly. The number of settable set values has also increased according to the increase in functionality.

The set values include, for example, set values relating to specifications of display apparatuses, set values relating to display, and set values relating to image processing.

The set values relating to specifications of display apparatuses include, for example, a resolution (display resolution), a representable color gamut, a representable gradation (bit depth), and a frame rate.

The set values relating to display include, for example, a brightness adjustment value, a color temperature set value, and a gamma set value.

The set values relating to image processing include, for example, an enhancer set value that adjusts the sharpness of displayed image, a set value of stored color correction processing that corrects the displayed colors on the basis of stored colors in humans (for example, the value of color after correction), a set value of frame rate conversion processing that converts the frame rate of dynamic images (for example, a frame rate after correction), whether black insertion processing is performed to increase dynamic image responsiveness by inserting black images between display frames, and whether dynamic gamma processing is performed to correct gamma values on the basis of statistics relating to the displayed image.

There are no unified specifications or standards relating to functions of the aforementioned image processing, and the types of the available image processing functions, methods for realizing the image processing, and the effects obtained typically differ depending on the display apparatus. The functions of the above-mentioned display processing will be referred to hereinbelow as "display unique functions" or simply "unique functions".

Further, the above-described increase in display functionality and increase in the degree of freedom in setting have resulted in the development of displays that can emulate another display as one of display application examples. The emulation as referred to herein is a process of executing the software developed for a certain hardware on another hardware of a different design. In the emulation, a program is activated by creating the environment of another display by simulation via software called "emulator".

In a workflow such as movie production, the final display is performed, for example, with a projector. Where a display can be prepared that can emulate the projector properties, it would be possible to check the appropriateness of produced contents (created image), without actually using the projector.

The displays capable of emulating the final output device (display that finally displays the images), such as described hereinabove, are expensive. Therefore, only several such displays are typically used in one job (one workflow). The display capable of emulating the aforementioned final output device will be referred to hereinbelow as a master display (master display apparatus).

Meanwhile, in a workflow such as movie production, the movie production operations are typically performed by several tens to several hundreds of people. Therefore, the operators perform operations by using displays that have no function of emulating another display. The display that has no function of emulating another display will be referred to hereinbelow as operation display (operation display apparatus).

Such an emulation function (function of emulating another display) is realized by a combination of display unique functions. The display unique functions typically differ among the displays. Therefore, when the operation results obtained in an operation display apparatus are displayed for checking on a master display apparatus (or a final display device (a projector or the like)), the desirable results are difficult to obtain. More specifically, due to the difference between the display unique functions, the display results obtained with the operation display apparatus can be significantly different from those obtained in the master display apparatus.

Japanese Patent Application Publication No. 2005-167678 discloses a method for displaying the processing results of an image processing apparatus at a terminal. More specifically, Japanese Patent Application Publication No. 2005-167678 indicates that where a terminal requests a server to transmit the image subjected to image processing, the server determines the image processing apparatus to be used and transmits to the terminal the image to which image processing has been applied in this image processing apparatus.

Japanese Patent Application Publication No. 2010-28658 discloses a system in which functional limitations are provided for each user and each function when an image-forming apparatus such as a printer is used. In the system disclosed in Japanese Patent Application Publication No. 2010-28658, where the user notifies the system of printing to a specific application by using a hot folder or the like, the functional limitation for each user is canceled and functional laminations are switched to those corresponding to the application.

SUMMARY OF THE INVENTION

However, even when the techniques disclosed in Japanese Patent Application Publication No. 2005-167678 and Japanese Patent Application Publication No. 2010-28658 are used, the desirable results cannot be easily obtained when the operation results obtained with the operation display apparatus are displayed for checking on the master display apparatus.

The technique disclosed in Japanese Patent Application Publication No. 2005-167678 involves emulating of the master display apparatus in the server and displaying the emulation results on the operation display apparatus. However, with such a configuration, the emulation results are subjected to additional processing by the display unique function of the operation display apparatus and therefore the correct emulation results cannot be displayed. In the first place, even when the above-described configuration is used, the operation results obtained in the operation display apparatus and the emulation results obtained in the master display apparatus will differ significantly from each other due to the difference in display unique functions.

The technique disclosed in Japanese Patent Application Publication No. 2010-28658 involves limiting the display functions according to the application. However, since the display unique functions typically differ depending on the display, even when the display functions are limited according to the application, the display results obtained in the operation display apparatus differ from the display results obtained in the master display apparatus.

The present invention provides a technique that makes it possible to obtain the desirable results easily when checking with the master display apparatus the operation results obtained with the operation display apparatus.

The present invention in its first aspect provides a display management system comprising:

an operation display apparatus that is used by a user when editing an image, and that performs image processing of an inputted image as necessary, and displays the processed image on a display unit;

a master display apparatus that is used to check the image edited by the user by using the operation display apparatus, and that performs image processing of an inputted image as necessary, and displays the processed image on a display unit; and a management server, wherein the management server has:

a selection unit that causes the user to select image processing that is executed by the master display apparatus when the image edited by the user by using the operation display apparatus is checked using the master display apparatus, from among image processing executable by the master display apparatus; and an instruction unit that instructs the operation display apparatus to execute the image processing selected by the selection unit in a case where this image processing can be executed by the operation display apparatus; and the operation display apparatus has:

an image processing unit that subjects the inputted image to the image processing performed under instruction by the instruction unit; and a display unit that displays on a display unit the image subjected to the image processing by the image processing unit.

The present invention in its second aspect provides a display management system comprising:

an operation display apparatus that is used by a user when editing an image, and that performs image processing of an inputted image as necessary, and displays the processed image on a display unit; and a master display apparatus that is used to check the image edited by the user by using the operation display apparatus, and that performs image processing of an inputted image as necessary, and displays the processed image on a display unit, wherein the master display apparatus has:

a selection unit that causes the user to select image processing that is executed by the master display apparatus when the image edited by the user by using the operation display apparatus is checked using the master display apparatus, from among image processing executable by the master display apparatus; and an instruction unit that instructs the operation display apparatus to execute the image processing selected by the selection unit in a case where this image processing can be executed by the operation display apparatus; and the operation display apparatus has:

an image processing unit that subjects the inputted image to the image processing performed under instruction by the instruction unit; and a display unit that displays on a display unit the image subjected to the image processing by the image processing unit.

The present invention in its third aspect provides an operation display apparatus that is used by a user when editing an image, and that performs image processing of an inputted image as necessary, and displays the processed image on a display unit, the operation display apparatus comprising:

a selection unit that causes the user to select image processing that is executed by a master display apparatus that is used to check the image edited by the user by using the operation display apparatus, and that performs image processing of an inputted image as necessary, and displays the processed image on a display unit, when the image edited by the user by using the operation display apparatus is checked using the master display apparatus, from among image processing executable by the master display apparatus;

an image processing unit that subjects the inputted image to the image processing selected by the selection unit in a case where this image processing can be executed by the operation display apparatus; and a display unit that displays on a display unit the image subjected to the image processing by the image processing unit.

The present invention in its fourth aspect provides a control method for a display management system comprising:

an operation display apparatus that is used by a user when editing an image, and that performs image processing of an inputted image as necessary, and displays the processed image on a display unit;

a master display apparatus that is used to check the image edited by the user by using the operation display apparatus, and that performs image processing of an inputted image as necessary, and displays the processed image on a display unit; and a management server, the control method comprising:

a selection step in which the management server causes the user to select image processing that is executed by the master display apparatus when the image edited by the user by using the operation display apparatus is checked using the master display apparatus, from among image processing executable by the master display apparatus;

an instruction step in which the management server instructs the operation display apparatus to execute the image processing selected in the selection step in a case where this image processing can be executed by the operation display apparatus;

an image processing step in which the operation display apparatus subjects the inputted image to the image processing as instructed in the instruction step; and a display step in which the operation display apparatus displays on a display unit the image subjected to the image processing in the image processing step.

The present invention in its fifth aspect provides a control method for a display management system comprising:

an operation display apparatus that is used by a user when editing an image, and that performs image processing of an inputted image as necessary, and displays the processed image on a display unit; and a master display apparatus that is used to check the image edited by the user by using the operation display apparatus, and that performs image processing of an inputted image as necessary, and displays the processed image on a display unit, the control method comprising:

a selection step in which the master display apparatus causes the user to select image processing that is executed by the master display apparatus when the image edited by the user by using the operation display apparatus is checked using the master display apparatus, from among image processing executable by the master display apparatus;

an instruction step in which the master display apparatus instructs the operation display apparatus to execute the image processing selected in the selection step in a case where this image processing can be executed by the operation display apparatus;

an image processing step in which the operation display apparatus subjects the inputted image to the image processing as instructed in the instruction step; and a display step in which the operation display apparatus displays on a display unit the image subjected to the image processing in the image processing step.

The present invention in its sixth aspect provides a control method for an operation display apparatus that is used by a user when editing an image, and that performs image processing of an inputted image as necessary, and displays the processed image on a display unit, the control method comprising:

a selection step of causing the user to select image processing that is executed by a master display apparatus that is used to check the image edited by the user by using the operation display apparatus, and that performs image processing of an inputted image as necessary, and displays the processed image on a display unit, when the image edited by the user by using the operation display apparatus is checked using the master display apparatus, from among image processing executable by the master display apparatus;

an image processing step of subjecting the inputted image to the image processing selected in the selection step in a case where this image processing can be executed by the operation display apparatus; and a display step of displaying on a display unit the image subjected to the image processing in the image processing step.

According to the present invention, when the operation results obtained with the operation display apparatus are checked with the master display apparatus, the desirable results can be easily obtained.

Further features of the present invention will become apparent from the following description of exemplary embodiments with reference to the attached drawings.

BRIEF DESCRIPTION OF THE DRAWINGS

FIG. 2 illustrates an example of unique function information on the master display apparatus;

FIG. 3 illustrates an example of unique function information on the operation display apparatus;

FIG. 4 illustrates an example of an image displayed when job-process definition information is generated and stored;

FIG. 5 illustrates an example of an image displayed when job-process definition information is generated and stored;

FIG. 6 illustrates an example of job-process definition information;

FIG. 7 illustrates an example of information stored in the ID storage unit;

DESCRIPTION OF THE EMBODIMENTS

<Embodiment 1>

A display management system and a control method therefor according to Embodiment 1 of the present invention will be described below.

Figure 1:
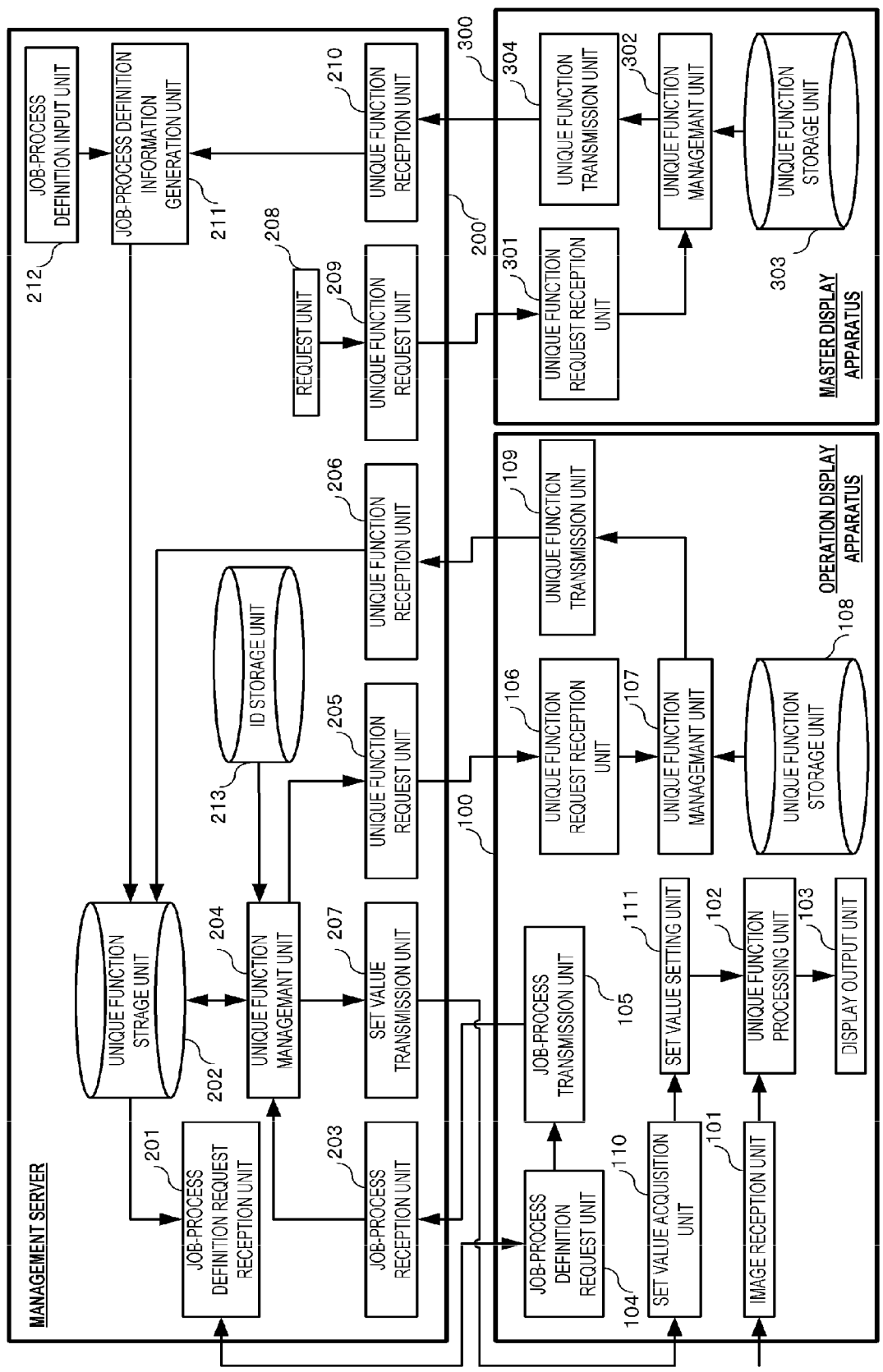
FIG. 1 is a block diagram illustrating an example of functional configuration of the display management system according to Embodiment 1.

FIG. 1 is a block diagram illustrating an example of the functional configuration of the display management system according to Embodiment 1.

An operation display apparatus 100 is used when a user edits an image. The operation display apparatus subjects the inputted image to image processing as necessary and displays the processed image.

The operation display apparatus 100 requests a management server 200 to transmit job-process definition information. The job-process definition information is information indicating a candidate of the operation (job and process) performed by the user. The "job" as referred to herein means the entire operation such as "movie production", and the "process" means a partial operation within the "job", such as "subtitle synthesis". The operation display apparatus 100 selects information on the job and process performed by the user from the received job-process definition information. The operation display apparatus 100 also outputs the selected information (job-process information).

Further, the operation display apparatus 100 also outputs unique function information in response to a request from the management server 200. The unique function information represents image processing (unique function) executable by the operation display apparatus 100.

The operation display apparatus 100 also receives a unique function set value from the management server 200. The unique function set value represents the unique function. The operation display apparatus 100 executes the unique function and performs the display according to the received set value. Thus, the operation display apparatus 100 performs image processing as instructed by the management server 200 with respect to the image and displays the processed image on a display unit.

The management server 200 outputs the job-process definition information in response to a request (a request to transmit the job-process definition information) from the operation display apparatus 100.

Further, the management server 200 determines a unique function that will be executed by the operation display apparatus 100 by using the job-process information from the operation display apparatus 100 and the unique function information relating to the operation display apparatus 100 and a master display apparatus 300. The management server 200 also transmits a set value that represents the determination result.

The master display apparatus 300 is used for checking the image that the user has edited using the operation display apparatus 100. The master display apparatus subjects the inputted image to image processing as necessary and displays the processed image on a display unit.

The master display apparatus 300 outputs the unique function information (information representing image processing executable by the master display apparatus 300) in response to a request from the management server 200.

Functions of the operation display apparatus 100 will be described below.

An image receiving unit 101 receives an image from the outside and outputs the received image to a unique function processing unit 102.

The unique function processing unit 102 subjects the image to image processing (unique function) as instructed by the management server 200. More specifically, the unique function processing unit 102 receives a unique function set value from a set value setting unit 111. The unique function processing unit 102 executes the unique function corresponding to the received unique function set value with respect to the image. Then, the unique function processing unit 102 outputs the image subjected to image processing to a display output unit 103.

The display output unit 103 displays the image (the image subjected to image processing) received from the unique function processing unit 102 on a display panel (liquid crystal display panel, plasma display panel, organic EL display panel, and the like) which is not shown in the figure.

A job-process definition request unit 104 requests the management server 200 to transmit job-process definition information when the operation display apparatus is activated.

The job-process definition request unit 104 also receives the job-process definition information from the management server 200 and transmits the received information to a job-process transmission unit 105.

The job-process transmission unit 105 selects, in accordance with user operation (for example, user operation performed by an operation panel), job-process information representing the object of using the operation display apparatus 100 from the job-process definition information received by the job-process definition request unit 104. For example, when the job-process definition information is received from the management server 200, the display output unit 103 displays this job-process definition information on a display panel (e.g., the display panel of the operation display apparatus 100). The user performs an operation of selecting the job and process that represent the object of using the operation display apparatus 100, while looking at the displayed job-process definition information. The job-process transmission unit 105 then selects the job-process information representing the object of using the operation display apparatus 100 from the job-process definition information in response to the user's operation. The job-process transmission unit 105 transmits the selected job-process information to the management server 200.

Where a unique function request reception unit 106 receives a request to transmit the unique function information from the management server 200, the unique function request reception unit sends the transmission request to a unique function management unit 107.

Where the unique function management unit 107 receives the transmission request from the unique function request reception unit 106, the unique function management unit reads the unique function information (information representing a unique function of the operation display apparatus 100) from a unique function storage unit 108.

The unique function management unit 107 then transmits the unique function information that has been read out to a unique function transmission unit 109. The information managed by the unique function management unit 107 (unique function information) will be described below.

The unique function storage unit 108 stores and holds the unique function information on the operation display apparatus 100.

The unique function transmission unit 109 transmits the received unique function information on the operation display apparatus 100 to the management server 200.

A set value acquisition unit 110 receives the unique function set value from the management server 200 and outputs the received unique function set value to the set value setting unit 111.

The set value setting unit 111 outputs the unique function set value received from the set value acquisition unit 110 to the unique function processing unit 102.

Each function of the management server 200 will be described below.

Where a job-process definition request reception unit 201 receives from the operation display apparatus 100 a request to transmit job-process definition information, the job-process definition request reception unit reads the job-process definition information from a unique function storage unit 202 and outputs the job-process definition information to the operation display apparatus 100.

For each operation, the unique function storage unit 202 stores as the job-process definition information the information on the image processing (unique function) that is executed by the master display apparatus 300 when the image edited by the user by performing the operation by using the operation display apparatus is checked using the master display apparatus 300. More specifically, the unique function storage unit 202 stores as the job-process definition information the information in which the job, the process, the emulation mode of the master display apparatus, the unique function of the master display apparatus, and the identifier (ID) of the unique function are associated with each other.

The unique function storage unit 202 stores the unique functions of the operation display apparatus 100.

The information stored in the unique function storage unit 202 will be described hereinbelow in greater detail.

A job-process reception unit 203 receives the job-process information from the operation display apparatus 100 and outputs the received job-process information to a unique function management unit 204.

Where the unique function management unit 204 receives the job-process information from the job-process reception unit 203, the unique function management unit checks whether or not unique function information on the operation display apparatus 100 has been stored in the unique function storage unit 202.

When the unique function information on the operation display apparatus 100 has not been stored in the unique function storage unit 202, collection of the unique function information on the operation display apparatus 100 is performed. More specifically, the unique function management unit 204 requests that a unique function request unit 205 collect unique function information on the operation display apparatus 100.

When the unique function information on the operation display apparatus 100 has been stored in the unique function storage unit 202, the unique function management unit 204 determines the unique function set value. More specifically, the unique function management unit 204 reads out and compares the unique function of the operation display apparatus 100 and the unique function executed by the master display apparatus 300 when the image edited using the operation display apparatus 100 is checked, from the unique function storage unit 202. By such a comparison, the unique function, among the unique functions of the operation display apparatus 100, that is identical to the unique function of the master display apparatus 300 (unique function executed by the master display apparatus 300 when the image edited using the operation display apparatus 100 is checked) is identified. However, in some cases, the operation display apparatus does not have the unique function identical to the unique function of the master display apparatus 300 (unique function executed by the master display apparatus 300 when the image edited using the operation display apparatus 100 is checked). In such a case, the unique function management unit 204 identifies a unique function substitutable for the unique function executed by the master display apparatus 300 when the image edited using the operation display apparatus 100 is checked, among the unique functions of the operation display apparatus 100, with reference to an ID storage unit 213. Then, the unique function management unit 204 outputs to a set value transmission unit 207 information indicating the above-mentioned identified unique function as a unique function set value that is set in (indicated to) the operation display apparatus 100.

The operation of the unique function management unit 204 (method for determining the unique function set value) will be described hereinbelow in greater detail.

The ID storage unit 213 receives and stores the ID of a unique function and the ID of a unique function substitutable for this unique function from an external input unit (not shown in the figure). In the present embodiment, the ID of a plurality of unique functions including the unique functions of the operation display apparatus 100 and the master display apparatus 300 and the ID of unique functions substitutable for those unique functions are stored.

The information stored in the ID storage unit 213 will be described below.

The set value transmission unit 207 outputs the inputted unique function set value to the operation display apparatus 100 (set value acquisition unit 110).

Where the unique function request unit 205 receives a request to collect unique function information from the unique function management unit 204, the unique function request unit requests the operation display apparatus 100 to transmit the unique function information.

A unique function reception unit 206 receives the unique function information from the operation display apparatus 100 and stores the received unique function information in the unique function storage unit 202.

A request unit 208 requests a unique function request unit 209 to collect the unique function information on the master display apparatus 300 in response to the operation on an operation panel (not shown in the figure) or the like performed by user. More specifically, where the user issues an instruction regarding a job setting to the management server 200, the request unit 208 requests the unique function request unit 209 to collect the unique function information on the master display apparatus 300. The request unit 208 may also request the unique function request unit 209 to collect the unique function information by using as a trigger the activation of the master display apparatus 300 or the connection of the master display apparatus 300 to the management server 200.

Where the unique function request unit 209 receives the request to collect the unique function information from the request unit 208, the unique function request unit requests the master display apparatus 300 to transmit the unique function information.

A unique function reception unit 210 receives the unique function information from the master display apparatus 300 and outputs the received unique function information to a job-process definition information generation unit 211.

The job-process definition information generation unit 211 receives the unique function information on the master display apparatus 300 from the unique function reception unit 210 and receives information corresponding to the user's operation from a job-process definition input unit 212. Then, the job-process definition information generation unit 211 generates the job-process definition information by using the received information and stores the generated job-process definition information in the unique function storage unit 202.

The job-process definition input unit 212 enables the user to select from the image processing (unique function) executable by the master display apparatus 300 the image processing executed by the master display apparatus 300 when the image edited by the user by using the operation display apparatus 100 is checked by using the master display apparatus 300. More specifically, the job-process definition input unit 212 outputs the information representing the job, the process, and the emulation mode and unique function of the master display apparatus 300 (the emulation mode and unique function that are used) to the job-process definition information generation unit 211 in response to the user's operation.

Functions of the master display apparatus 300 will be described below.

Where a unique function request reception unit 301 receives a request to transmit the unique function information from the management server 200, the unique function request reception unit sends the transmission request to a unique function management unit 302.

Where the unique function management unit 302 receives the transmission request from the unique function request reception unit 301, the unique function management unit reads the unique function information (information representing the unique function on the master display apparatus 300) from a unique function storage unit 303. Then, the unique function management unit 302 transmits the unique function information that has been read out to a unique information transmission unit 304.

The unique function storage unit 303 stores and holds the unique function information on the master display apparatus 300.

The unique information transmission unit 304 transmits the received unique function information on the master display apparatus 300 to the management server 200.

The unique function and emulation mode of the master display apparatus 300 in the present embodiment will be explained below with reference to FIG. 2. FIG. 2 shows an example of unique function information stored in the unique function storage unit 303.

The "emulation mode" in FIG. 2 indicates the emulation mode of the master display apparatus 300.

The "used unique function" as referred to herein is the unique function of the master display apparatus 300 that is used in the corresponding emulation mode.

The "ID" as referred to herein is the ID of the corresponding unique function.

FIG. 2 illustrates the case where the master display apparatus 300 has two emulation modes, namely, a "C COMPANY PROJECTOR MODE" and a "P COMPANY TELEVISION SET MODE". The "C COMPANY PROJECTOR MODE" is a mode in which the master display apparatus 300 emulates the display of a projector produced by a C company. The "P COMPANY TELEVISION SET MODE" is a mode in which the master display apparatus 300 emulates the display of a television set produced by a P company.

FIG. 2 indicates that six unique functions, namely, "FRC", "BLACK INSERTION", "LOCAL DIMMING", "DYNAMIC GAMMA", "MEMORY COLOR CORRECTION", and "ENHANCER", are used in the "C COMPANY PROJECTOR MODE". Further, FIG. 2 also indicates that the abovementioned six unique functions are used in the "P COMPANY TELEVISION SET MODE".

The "FRC" means frame rate conversion and means a function of converting the frame rate of an inputted dynamic image. The details relating to the "FRC" function are outside the scope of the present invention and are therefore omitted. In the example shown in FIG. 2, the ID of the "FRC" used in the "C COMPANY PROJECTOR MODE" is "FRC004", and the ID of the "FRC" used in the "P COMPANY TELEVISION SET MODE" is "FRC006".

In this case, the unique function (image processing) is specified by a combination of an algorithm and values of parameters necessary for processing. In the present embodiment, it is assumed that a unique ID for each combination of algorithm and parameter values is statically allocated. This is why the ID of the "FRC" is different in the "C COMPANY PROJECTOR MODE" and "P COMPANY TELEVISION SET MODE" (because the algorithm and parameter values of unique function are different).

A method for determining the "ID" is not described in detail. For example, the "ID" is determined by the manufacturer of the master display apparatus or the entity making the definition.

The "BLACK INSERTION" means a function of inserting a black image between the frames of the inputted dynamic image. The "BLACK INSERTION" is performed to increase visual dynamic responsiveness in a display using a display device in which the dynamic image responsiveness is not high, such as a liquid crystal panel. The details relating to the "BLACK INSERTION" function are outside the scope of the present invention and are therefore omitted. In the example shown in FIG. 2, the ID of the "BLACK INSERTION" used in the "C COMPANY PROJECTOR MODE" is "K001", and the ID of the "BLACK INSERTION" used in the "P COMPANY TELEVISION SET MODE" is "K002".

The "LOCAL DIMMING" is a function of controlling the backlight brightness for each predetermined region in combination with liquid crystal element control in order to increase the dynamic range, for example, in liquid crystal panels having a direct-type LED backlight. The details relating to the "LOCAL DIMMING" function are outside the scope of the present invention and are therefore omitted. In the example shown in FIG. 2, the ID of the "LOCAL DIMMING" used in the "C COMPANY PROJECTOR MODE" is "LD005", and the ID of the "LOCAL DIMMING" used in the "P COMPANY TELEVISION SET MODE" is "LD004".

The ID is also similarly associated with the "DYNAMIC GAMMA", "MEMORY COLOR CORRECTION" and "ENHANCER"

Thus, the emulation mode of the master display apparatus 300 is realized by the combination of ID of unique functions, that is, the combination of algorithm and parameter values of the unique functions. Therefore, the emulation mode of the master display apparatus 300 can be defined by the combination of IDs of unique functions.

As a consequence, where the unique functions with the same ID are used in the master display apparatus 300 and the operation display apparatus 100, the same processing can be performed and the same display can be performed in the master display apparatus 300 and the operation display apparatus 100.

In the present embodiment, the unique functions of the operation display apparatus 100 will be described with reference to FIG. 3. FIG. 3 illustrates an example of unique function information stored in the unique function storage unit 108.

The "OWN UNIQUE FUNCTION" in FIG. 3 indicates a unique function of the operation display apparatus 100.

The "USABLE ID" indicates the ID of a unique function that can be executed as the corresponding unique function.

FIG. 3 indicates that the operation display apparatus 100 has four unique functions, namely, "FRC", "BLACK INSERTION", "MEMORY COLOR CORRECTION", and "ENHANCER".

In the example shown in FIG. 3, four ID, namely, "FRC003", "FRC001", "FRC005", and "FRC006" are associated with the "FRC". It means that the operation display apparatus 100 can execute the FRC with the ID "FRC003", "FRC001", "FRC005", and "FRC006" and cannot execute the FRC with other IDs. Likewise, the ID of an executable unique function is also associated with the "BLACK INSERTION", "MEMORY COLOR CORRECTION", and "ENHANCER".

The flow of processing performed when the unique function information on the master display apparatus 300 and the job-process information are associated and stored in the unique function storage unit 202 will be described below. Thus, the flow of processing performed when the job-process definition information on the management server 200 is generated and stored will be explained.

First, the job-process definition input unit 212 performs the image display such as shown in FIG. 4 and the job name and the emulation mode used in the job are inputted (selected) by the user. Thus, the emulation mode that is set in the master display apparatus 300 when the image edited by the job is checked is inputted by the user. In the example illustrated by FIG. 4, the display is performed such that the emulation mode that will be used is selected from the emulation modes indicated in the unique function information shown in FIG. 2 (that is, the emulation modes of the master display apparatus 300). The information on the emulation mode and the job name that have been set is outputted to the job-process definition information generation unit 211. The job-process definition input unit 212 can perform the display such as shown in FIG. 4 by acquiring the unique function information on the master display apparatus from the job-process definition information generation unit 211.

The job-process definition input unit 212 performs the image display such as shown in FIG. 5 and the process name and the emulation mode used in the process are inputted (selected) by the user. Thus, the unique function that is executed by the master display apparatus 300 when the image edited in the process is checked is inputted by the user. In the example illustrated by FIG. 5, the display is performed such that the unique function that will be used is selected from the unique functions (unique functions of the master display apparatus 300) associated with the emulation mode that has been selected during the image display illustrated by FIG. 4. The information on the unique function and the process name that have been set is outputted to the job-process definition information generation unit 211.

The image shown in FIGS. 4 and 5 may be displayed on the master display apparatus 300 or the operation display apparatus 100. When the management server 200 has a display unit, the image may be displayed on the display unit.

The job-process definition input unit 212 repeatedly displays the image illustrated by FIG. 5 for the number of necessary processes with respect to one job. The number of necessary processes may be inputted in advance by the user (for example, when the job name is set). The image illustrated by FIG. 5 may be also repeatedly displayed till the user performs the operation of ending the job-process input. Where the setting of the necessary number of processes is completed, the job-process definition information such as shown in FIG. 6 is generated by the job-process definition information generation unit 211 and stored in the unique function storage unit 202. More specifically, a table in which the jobs, emulation modes that will be used, processes, unique functions that will be used, and ID of unique functions that will be used are associated is generated as the job-process definition information. The IDs in the table are uniquely set by using the unique function information inputted from the unique function reception unit 210 (unique function information of the master display apparatus 300).

The information stored in the ID storage unit 213 is described below.

As has already been explained, in the present embodiment, it is assumed that the IDs are determined by the manufacturer of the master display apparatus 300 or the entity making the definition, and no detailed explanation of the determination method is presented.

Likewise, it is assumed that a unique function of another ID that is substitutable for a unique function with a certain ID is also determined by the manufacturer of the master display apparatus 300 or the entity making the definition.

The ID storage unit 213 stores, for example, a table such as shown in FIG. 7. In the example shown in FIG. 7, the names of unique functions, IDs of unique functions, and IDs of unique functions substitutable for each ID (each unique function) are associated with each other.

For example, FIG. 7 indicates that the unique functions with ID "FRC002" and "FRC003" can be substituted for the unique function with ID "FRC001". In other words, practically the same result can be obtained with the processing based on the unique function with ID "FRC001" and the processing based on the unique functions with ID "FRC002" and "FRC003".

Figure 8:
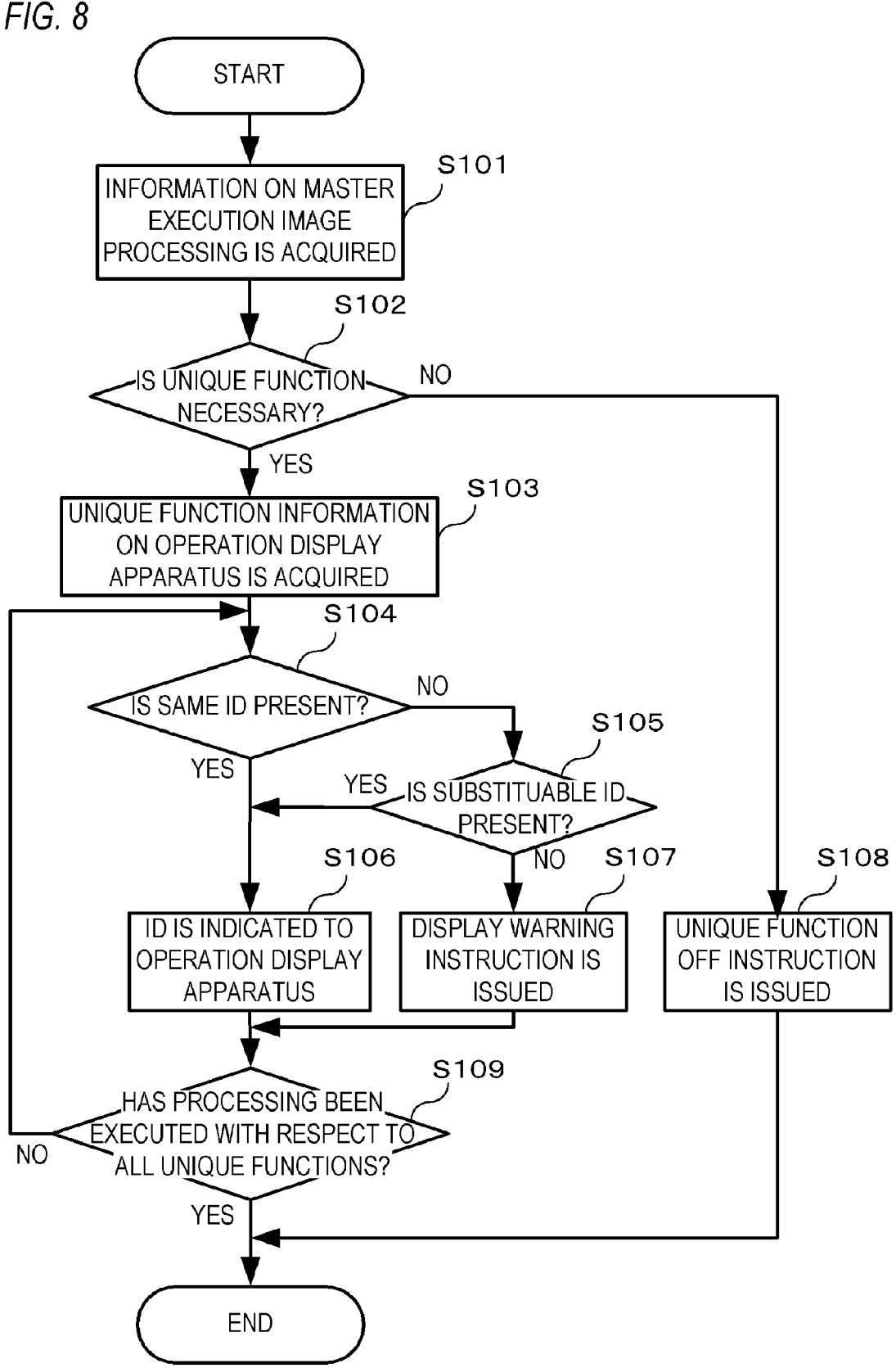
FIG. 8 is a flowchart illustrating an example of processing flow for determining a unique function set value according to Embodiment 1.

The ID determination processing of the unique function executed by the operation display apparatus 100 (determination processing of unique function set value), which is performed by the unique function management unit 204, will be explained below with reference to FIG. 8.

The unique function management unit 204 receives the job-process information representing the operation performed by the operation display apparatus 100 from the job-process reception unit 203 and compares the received job-process information with the job-process definition information stored in the unique function storage unit 202. Then, the information on the ID of the unique function and the emulation mode of the master display apparatus 300 that corresponds to the job and process indicated by the job-process information is acquired from the unique function storage unit 202 (S101). Thus, the information on the image processing (master execution image processing) executed by the master display apparatus 300 when checking the image edited by using the operation display apparatus 100 is acquired.

Then, the unique function management unit 204 determines, from the information acquired from the unique function storage unit 202 in S101, as to whether or not the execution of the unique function is necessary when performing the job and process indicated by the job-process information (S102). More specifically, it is determined whether or not the ID of the unique function is included in the information acquired by the processing of S101.

In the case where the execution of the unique function is not required when the job and process indicated by the job-process information are performed, that is, in the case where the ID of the unique function is not included in the information acquired in the processing of S101, the processing advances to S108.

In the case where the execution of the unique function is necessary when the job and process indicated by the job-process information are performed, that is, in the case where the ID of the unique function is included in the information acquired in the processing of S101, the processing advances to S103.

In S108, the unique function management unit 204 instructs the operation display apparatus 100 via the set value transmission unit 207 not to use the unique function. For example, the unique function management unit 204 instructs the set value transmission unit 207 to transmit empty information as the unique function set value. As a result, the image is displayed by the operation display apparatus 100, without executing the unique function.

In S103, the unique function management unit 204 acquires the unique function information on the operation display apparatus 100 from the unique function storage unit 202.

Then, the unique function management unit 204 determines whether or not the image processing (master execution image processing) that is executed by the master display apparatus 300 when checking the image edited using the operation display apparatus 100 can be executed by the operation display apparatus 100 (S104). More specifically, it is determined whether or not the ID (master execution ID) associated with the job and process indicated by the job-process information of the job-process definition information is included in the unique function information on the operation display apparatus 100.

In the case where the master execution image processing can be executed by the operation display apparatus 100, the processing advances to S106. Thus, in the case where the master execution ID is included in the unique function information on the operation display apparatus 100, the processing advances to S106.

In the case where the master execution image processing cannot be executed by the operation display apparatus 100, the processing advances to S105. Thus, in the case where the master execution ID is not included in the unique function information on the operation display apparatus 100, the processing advances to S105.

In S105, the unique function management unit 204 refers to the ID storage unit 213 and determines whether or not the image processing substitutable for the master execution image processing can be executed by the operation display apparatus 100. More specifically, it is determined whether or not the ID associated with the abovementioned master execution ID in the information stored in the ID storage unit 213 is included in the unique function information on the operation display apparatus 100.

In the case where the image processing substitutable for the master execution image processing can be executed by the operation display apparatus 100, the processing advances to S106. Thus, in the case where the ID associated with the abovementioned master execution ID in the information stored in the ID storage unit 213 is included in the unique function information on the operation display apparatus 100, the processing advances to S106.

In the case where the image processing substitutable for the master execution image processing cannot be executed by the operation display apparatus 100, the processing advances to S107. Thus, in the case where the ID associated with the abovementioned master execution ID in the information stored in the ID storage unit 213 is not included in the unique function information on the operation display apparatus 100, the processing advances to S107.

In S106, the unique function management unit 204 instructs the operation display apparatus 100 via the set value transmission unit 207 to perform the unique function (image processing) identical or similar to that of the master display apparatus 300. More specifically, the unique function management unit 204 instructs the set value transmission unit 207 to output as the unique function set value the ID of the image processing (unique function) that has been determined in S104 or S105 to be executable. Thus, in the present embodiment, in the case where the master execution image processing can be executed by the operation display apparatus 100, the operation display apparatus 100 is instructed to execute the image processing. Further, in the case where the master execution image processing cannot be executed by the operation display apparatus 100, the operation display apparatus 100 is instructed to execute the image processing substitutable for the master execution image processing, from among the image processing executable by the operation display apparatus 100. As a result, the operation display apparatus 100 performs the image processing identical (or similar) to the image processing executed by the master display apparatus 300 during checking and displays the processed image. As a result, the display of the operation display apparatus 100 during the operation and the display of the master display apparatus 300 during checking are identical (similar).

The processing then advances to S109.

In S107, the unique function management unit 204 instructs the operation display apparatus 100 via the set value transmission unit 207 to display a warning to the effect that the display identical to that of the master display apparatus 300 cannot be performed. For example, the unique function management unit 204 instructs the set value transmission unit 207 to transmit, as a unique function set value, a warning signal indicating that the display identical to that of the master display apparatus 300 cannot be performed. In this case, the operation display apparatus 100 (display output unit 103) displays a warning to the effect that the display identical to that of the master display apparatus 300 cannot be performed on a display panel. As a result, the user (operator) is notified of the fact that the host apparatus (operation display apparatus 100) cannot perform the display identical to that of the master display apparatus 300. Where the user is notified of the fact that the host apparatus (operation display apparatus 100) cannot perform the display identical to that of the master display apparatus 300, the user can change as appropriate the operation display apparatus 100 or change as appropriate the operation contents using the operation display apparatus 100. More specifically, the user can change the apparatus that is being used into the operation display apparatus that can perform the display identical to that of the master display apparatus 300. The user can also change the operation contents using the operation display apparatus 100 to the operation contents that can perform the display identical to that of the master display apparatus 300.

In the case where a plurality of image processing is selected with respect to the job and process indicated by the job-process information when the job-process definition information is generated, an instruction (output of the unique function set value) is issued to the operation display apparatus 100 for each selected image processing. Thus, in the case where a plurality of unique functions (image processing) is associated with the job and process indicated by the job-process information in the job-process definition information, the processing from S104 to S107 is performed for each unique function.

In S109, the unique function management unit 204 determines whether the processing from S104 to S107 has been executed with respect to all of the unique functions associated with the job and process indicated by the job-process information in the job-process definition information.

In the case where the processing from S104 to S107 has been executed with respect to all of the unique functions, the present flow is ended. Otherwise, the unique function that is the processing target is switched and the processing returns to S104.

Described hereinbelow is the determination processing for the unique function set value explained with respect to the case where the information shown in FIGS. 2, 3, and 6 is stored in the unique function storage unit 202 and the information shown in FIG. 7 is stored in the ID storage unit 213. In the explanation below, the "MOVIE PRODUCTION FOR "A" COMPANY" is selected as the job and the "PRE-COLOR GRADING PROCESS" is selected as the process in the operation display apparatus 100.

First, in S101, the IDs "LD005" and "KH001" of the unique functions "LOCAL DIMMING" and "STORED COLOR CORRECTION" corresponding to the "MOVIE PRODUCTION FOR "A" COMPANY" job and the "PRE-COLOR GRADING PROCESS" process are acquired from the job-process definition information shown in FIG. 6.

Accordingly, the unique functions are determined in S102 to be necessary when performing the job and process indicated by the job-process information, and the processing advances to S103.

Then, in S103, the unique function information illustrated by FIG. 3 is acquired. From FIG. 3, it is clear that the operation display apparatus 100 does not have the unique function of "LOCAL DIMMING" and has the ID "KH001" as the unique function of "STORED COLOR CORRECTION".

First, "LOCAL DIMMING" is selected as the unique function that is the processing target, and the processing of S104 and subsequent steps is performed.

As mentioned hereinabove, the operation display apparatus 100 does not have the unique function of "LOCAL DIMMING". Therefore, in S104 and S105, it is determined that the operation display apparatus 100 cannot execute the master execution image processing (ID "LD005") and the image processing substitutable for the master execution image processing, and the processing advances to S107. As a result, a warning display is performed in the operation display apparatus 100. The warning display includes, for example, the following warning: "In the apparatus, local dimming similar to that of the master display apparatus cannot be executed. Therefore, the display differs from that of the master display apparatus".

Then, since the "STORED COLOR CORRECTION" has not been taken as the processing target, the processing target is taken in S109 as the "STORED COLOR CORRECTION", and the processing returns to S104.

As described hereinabove, the operation display apparatus 100 has the unique function of ID "KH001" as the unique function of "STORED COLOR CORRECTION". Therefore, it is determined in S104 that the operation display apparatus 100 can execute the master execution image processing, and the processing advances to S106. As a result, in the operation display apparatus 100, the image is subjected to image processing (stored color correction) with ID "KH001" and the processed image is displayed.

In the case where the unique function of "STORED COLOR CORRECTION" of the operation display apparatus 100 is the unique function with ID "KH003", it is determined in S104 that the operation display apparatus 100 cannot executed the master execution image processing. Then, in S105, it is determined that the operation display apparatus 100 can execute the image processing (the image processing with ID "KH003") substitutable for the master execution image processing, and the processing advances to S106. As a result, in the operation display apparatus 100, the image is subjected to image processing with ID "KH003" and the processed image is displayed.

As mentioned hereinabove, in the present embodiment, the image processing that is executed by the master display apparatus when the image edited by the user by using the operation display apparatus is checked using the master display apparatus is selected by the user from the image processing executable by the master display apparatus. In the case where the operation display apparatus can execute the selected image processing, the image processing is executed by the operation display apparatus. Therefore, the desirable result can be obtained when the operation result obtained in the operation display apparatus is checked by the master display apparatus. More specifically, the image processing executed by the operation display apparatus can be matched with that of the master display apparatus, and the display in the operation display apparatus can be matched with the display in the master display apparatus. Further, in the present embodiment, the image processing executed by the operation display apparatus is automatically selected from a multiplicity of various image processing. Therefore, it is not necessary for the user to rely on a trial and error method to determine the image processing that will be executed, and the display of the operation display apparatus can be easily matched with the display of the master display apparatus.

Further, in the present embodiment, in the case where the abovementioned selected image processing cannot be executed by the operation display apparatus, the operation display apparatus executes the image processing substitutable for the selected image processing, from among the image processing executable by the operation display apparatus. As a result, even when the selected image processing cannot be executed by the operation display apparatus, the display in the operation display apparatus and the display in the master display apparatus can be matched.

Further, in the present embodiment, in the case where the abovementioned selected image processing and the image processing substitutable for the image processing cannot be executed by the operation display apparatus, a warning to the effect that the display identical to that of the master display apparatus cannot be performed by the operation display apparatus is displayed. Therefore, the user can determine that the display identical to that of the master display apparatus cannot be performed in the present operation display apparatus.

In the present embodiment, it is assumed that in the case where a plurality of image processing has been selected with respect to the job and process indicated by the job-process information when the job-process definition information is generated, the output of the unique function set value is performed for each selected image processing, but such a feature is not limiting. For example, the output of the unique function set value may be performed once. More specifically, it is possible to determine the ID of the image processing (selected image processing or image processing substitutable for the selected image processing) executed by the operation display apparatus for each selected image processing and output all of the determined ID as the unique function set values. Further, the abovementioned warning signal may be outputted as the unique function set value even when there is only one image processing, or the image processing substitutable for this image processing, that cannot be executed by the operation display apparatus, among the selected image processing. Only the ID of the executable image processing (selected image processing or image processing substitutable for the selected image processing) may be also outputted as the unique function set value, without outputting the warning signal.

<Embodiment 2>

The display management system and control method therefor according to Embodiment 2 of the present invention will be described below.

Figure 9:
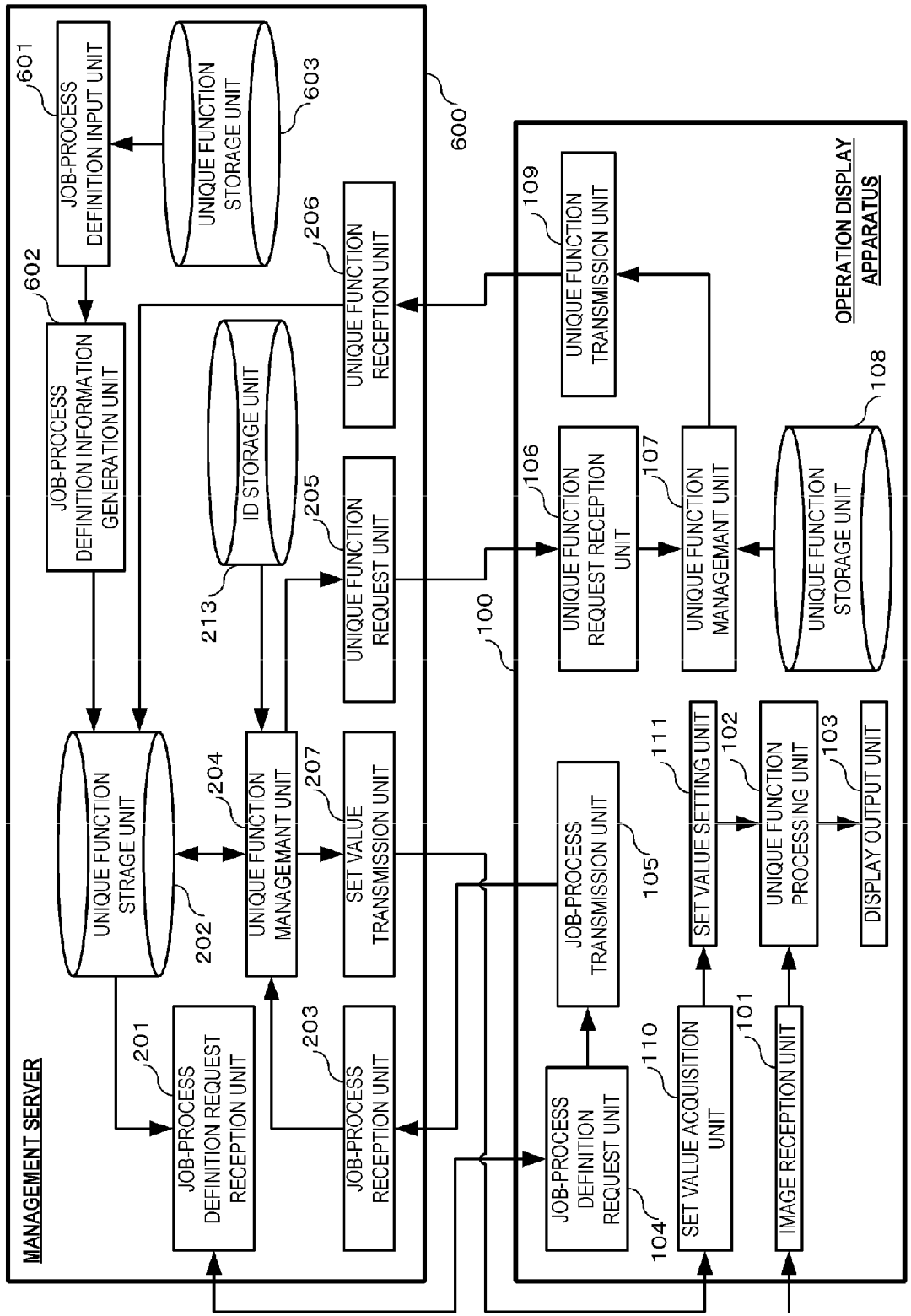
FIG. 9 is a block diagram illustrating an example of functional configuration of the display management system according to Embodiment 2.

FIG. 9 is a block diagram illustrating an example of the functional configuration of the display management system according to Embodiment 2.

In FIG. 9, the functional blocks performing the functions and operations similar to those performed in Embodiment 1 are assigned with same reference numerals and the explanation thereof is herein omitted.

The display management system according to the present embodiment has an operation display apparatus and a master display apparatus (management server). More specifically, as shown in FIG. 9, in the present embodiment, the management server has the unique function information (unique function information on the master display apparatus) that is managed by the master display apparatus in Embodiment 1. In other words, the master display apparatus has the functions of the management server of Embodiment 1.

The operation display apparatus 100 has the same configuration and functions as in Embodiment 1.

A management server 600 (master display apparatus) outputs job-process definition information in response to a request from the operation display apparatus 100 to transmit the job-process definition information.

Further, the management server 600 determines the unique functions that are set in the operation display apparatus 100 by using the job-process information from the operation display apparatus 100 and also the unique function information on the operation display apparatus 100 and master display apparatus. The management server 600 then transmits the set value representing the determination result.

The functions of the management server 600 will be described below. The functions same as those in Embodiment 1 are assigned with same reference numerals and the explanation thereof is herein omitted.

A job-process definition input unit 601 causes the user to select the image processing that is executed by the master display apparatus when the image edited by the user by using the operation display apparatus 100 is checked using the master display apparatus, from among the image processing (unique functions) executable by the master display apparatus (management server 600). More specifically, the job-process definition input unit 601 outputs the information representing the job, process, and emulation mode and unique functions of the master display apparatus in response to the user's operation to a job-process definition information generation unit 602. The specific operation of the job-process definition input unit 601 is similar to that of the job-process definition input unit 212 of Embodiment 1 and therefore the explanation thereof is herein omitted.

The job-process definition information generation unit 602 uses the unique function information stored in a unique function storage unit 603 and the information from the job-process definition input unit 601 to generate the unique function definition information and stores the generated unique function definition information in the unique function storage unit 202. The method for generating the unique function definition information is similar to that used in the job-process definition information generation unit 211 of Embodiment 1 and therefore the explanation thereof is herein omitted.

The unique function storage unit 603 stores and holds the unique function information (for example, the information similar to that shown in FIG. 2) on the master display apparatus. The abovementioned unique function information may or may not be stored in advance in the unique function storage unit 603. For example, when the management server 600 is an apparatus different from the master display apparatus, the information similar to that shown in FIG. 2 may be inputted from an external input unit or the like (not shown in the figure) and stored in the unique function storage unit 603.

As described hereinabove, in the present embodiment, the functions of the management server and master display apparatus are realized by a single apparatus. Therefore, communication between the management server and master display apparatus can be omitted. Further, functions similar to those of Embodiment 1 can be realized with fewer apparatuses than in Embodiment 1.

<Embodiment 3>

The operation display apparatus and control method therefor according to Embodiment 3 of the present invention will be described below.

Figure 10:
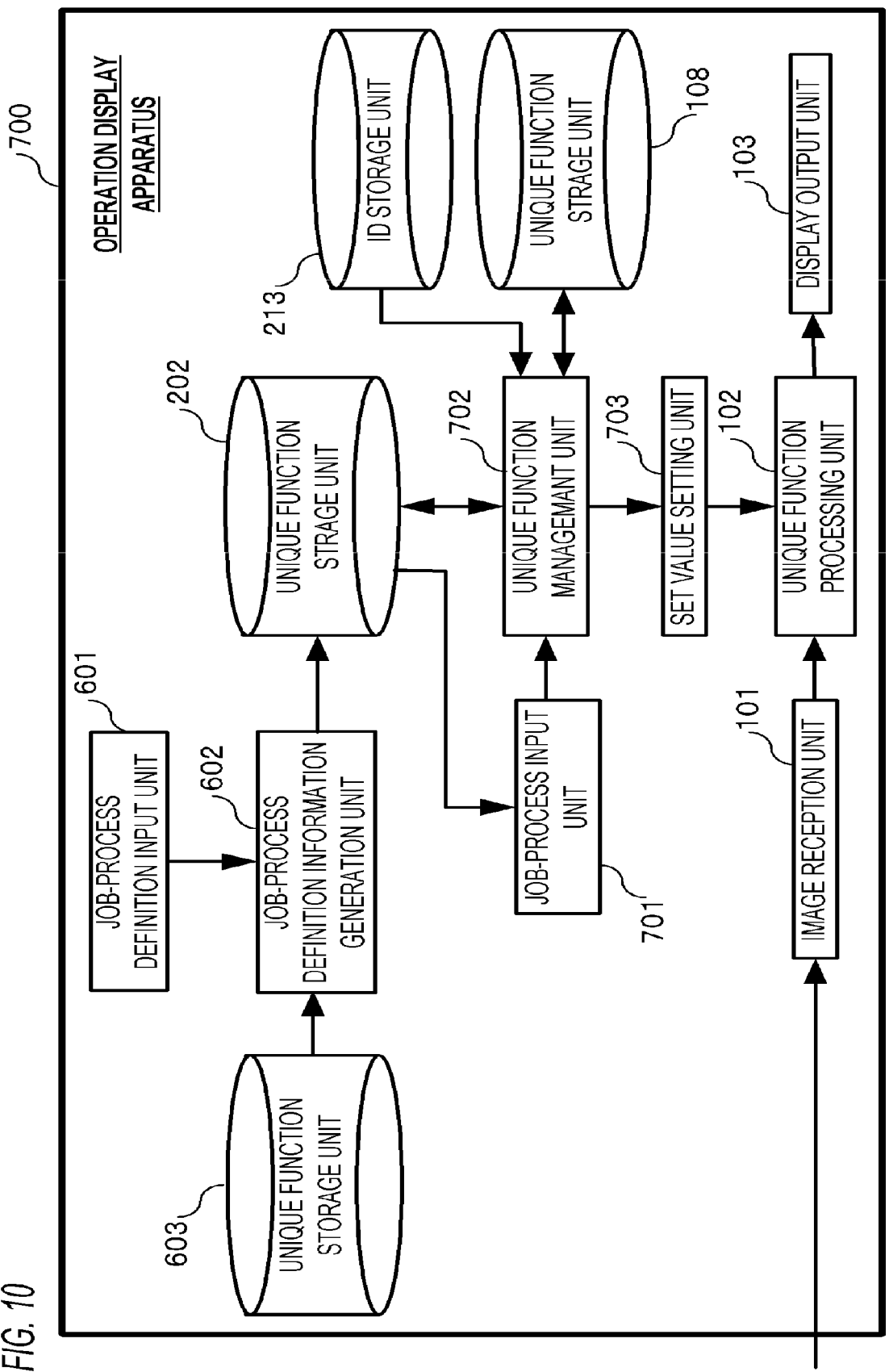
FIG. 10 is a block diagram illustrating an example of functional configuration of the operation display apparatus according to Embodiment 3.

FIG. 10 is a block diagram illustrating an example of the functional configuration of the operation display apparatus according to Embodiment 3.

In FIG. 10, the functional blocks performing the functions and operations similar to those performed in Embodiments 1 and 2 are assigned with same reference numerals and the explanation thereof is herein omitted.

An operation display apparatus 700 according to the present embodiment stores in a storage unit the unique function information (unique function information on a master display apparatus) that is managed by the master display apparatus in Embodiment 1. The operation display apparatus 700 according to the present embodiment further has the functions of the management server of Embodiment 1.

Functions of the operation display apparatus 700 will be explained below. Functions same as those of Embodiments 1 and 2 are assigned with same reference numerals and the explanation thereof is herein omitted.

A job-process input unit 701 receives job-process definition information from the unique function storage unit 202 and notifies a unique function management unit 702 of the job-process information selected in response to the user's operation.

Where the unique function management unit 702 receives the job-process information from the job-process input unit 701, the unique function management unit reads from the unique function storage unit 202 the information on the emulation mode and unique functions of the master display apparatus corresponding to the job and process indicated by the job-process information. Further, the unique function management unit 702 reads the unique function information on the operation display apparatus 700 from the unique function storage unit 108.

The unique function management unit 702 compares the unique function of the operation display apparatus 700 that has been read out with the unique function (master execution image processing) of the master display apparatus. The comparison is used to identify the image processing identical to the master execution image processing among the image processing executable by the operation display apparatus 700. However, the operation display apparatus sometimes does not have the unique function identical to the master execution image processing. In such a case, the unique function management unit 702 refers to the ID storage unit 213 to identify the image processing substitutable for the master execution image processing among the image processing executable by the operation display apparatus 700. The unique function management unit 702 outputs the information indicating the abovementioned identified image processing (unique function) as the unique function set value to the set value transmission unit 207.

The method for determining the unique function set value with the unique function management unit 702 is the same as in Embodiment 1 and the explanation thereof is herein omitted.

A set value setting unit 703 outputs the unique function set value inputted from the unique function management unit 702 to the unique function processing unit 102. As a result, for example, in the case where the master execution image processing can be executed by the operation display apparatus 700, the image processing is performed with respect to the inputted image and therefore the effect same as that of Embodiments 1 and 2 can be obtained.

The information is inputted for storage in the unique function storage unit 603 and ID storage unit 213, for example, from an external input unit (not shown in the figure).

As mentioned hereinabove, the present embodiment makes it possible to obtain the results similar to those of Embodiments 1 and 2 with the operation display apparatus alone. Further, communication between the management server, operation display apparatus, and master display apparatus can be omitted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-156604, filed on Jul. 15, 2011, which is hereby incorporated by reference herein in its entirety.

What is claimed is:

1. A display management system comprising:
an operation display apparatus that performs image processing of an inputted image as necessary, and displays the processed image on a display unit;
a master display apparatus that performs image processing of an inputted image as necessary, and displays the processed image on a display unit; and
a management server, wherein
the management server has:
a selection unit that causes a user to select an image processing from a plurality of image processing executable by the master display apparatus; and
an instruction unit that instructs the operation display apparatus to execute the image processing selected by the selection unit in a case where this image processing can be executed by the operation display apparatus, and instructs the operation display apparatus to execute image processing substitutable for the image processing selected by the selection unit in a case where the image processing selected by the selection unit cannot be executed by the operation display apparatus;
the management server further has a storage unit that stores first function information representing the plurality of image processing executable by the master display apparatus, second function information representing image processing executable by the operation display apparatus, and substitution information representing substitutable image processing for each image processing;
the selection unit causes the user to select an image processing from the plurality of image processing represented by the first function information; and
the instruction unit compares the image processing selected by the selection unit with the second function information and determines whether or not the image processing selected by the selection unit can be executed by the operation display apparatus; and determines the substitutable image processing by comparing the image processing selected by the selection unit, the second function information, and the substitution information when the image processing selected by the selection unit is determined to be unexecutable by the operation display apparatus.

2. The display management system according to claim 1, wherein when the image processing selected by the selection unit and image processing substitutable for this image processing cannot be executed by the operation display apparatus, the instruction unit instructs the operation display apparatus to display a warning to the effect that the display identical to that of the master display apparatus cannot be performed.

3. The display management system according to claim 1, wherein the selection unit causes the user to select an image processing that is executed by the master display apparatus.

4. A display management system comprising:

an operation display apparatus that performs image processing of an inputted image as necessary, and displays the processed image on a display unit; and a master display apparatus that performs image processing of an inputted image as necessary, and displays the processed image on a display unit, wherein the master display apparatus has:

a selection unit that causes a user to select an image processing from a plurality of image processing executable by the master display apparatus; and an instruction unit that instructs the operation display apparatus to execute the image processing selected by the selection unit in a case where this image processing can be executed by the operation display apparatus, and instructs the operation display apparatus to execute image processing substitutable for the image processing selected by the selection unit in a case where the image processing selected by the selection unit cannot be executed by the operation display apparatus;

the master display apparatus further has a storage unit that stores first function information representing the plurality of image processing executable by the master display apparatus, second function information representing image processing executable by the operation display apparatus, and substitution information representing substitutable image processing for each image processing;

the selection unit causes the user to select an image processing from the plurality of image processing represented by the first function information; and the instruction unit compares the image processing selected by the selection unit with the second function information and determines whether or not the image processing selected by the selection unit can be executed by the operation display apparatus; and determines the substitutable image processing by comparing the image processing selected by the selection unit, the second function information, and the substitution information when the image processing selected by the selection unit is determined to be unexecutable by the operation display apparatus.

5. The display management system according to claim 4, wherein when the image processing selected by the selection unit and the image processing substitutable for this image processing cannot be executed by the operation display apparatus, the instruction unit instructs the operation display apparatus to display a warning to the effect that the display identical to that of the master display apparatus cannot be performed.

6. The display management system according to claim 4, wherein the selection unit causes the user to select an image processing that is executed by the master display apparatus.

7. An operation display apparatus that performs image processing of an inputted image as necessary, and displays the processed image on a display unit, the operation display apparatus comprising:

a selection unit that causes a user to select an image processing from a plurality of image processing executable by a master display apparatus that performs image processing of an inputted image as necessary and displays the processed image on a display unit;

an image processing unit that subjects the inputted image to the image processing selected by the selection unit in a case where this image processing can be executed by the operation display apparatus, and subjects the inputted image to image processing substitutable for the image processing selected by the selection unit in a case where the image processing selected by the selection unit cannot be executed by the operation display apparatus; and a display control unit that displays on a display unit the image subjected to the image processing by the image processing unit, wherein the operation display apparatus further has a storage unit that stores first function information representing the plurality of image processing executable by the master display apparatus, second function information representing image processing executable by the operation display apparatus, and substitution information representing image processing substitutable image processing for each image processing;

the selection unit causes the user to select an image processing from the plurality of image processing represented by the first function information; and the image processing unit compares the image processing selected by the selection unit with the second function information and determines whether or not the image processing selected by the selection unit can be executed by the operation display apparatus; and determines the substitutable image processing by comparing the image processing selected by the selection unit, the second function information, and the substitution information when the image processing selected by the selection unit is determined to be unexecutable by the operation display apparatus.

8. The operation display apparatus according to claim 7, wherein when the image processing selected by the selection unit and image processing substitutable for this image processing cannot be executed by the operation display apparatus, the display control unit displays a warning to the effect that the display identical to that of the master display apparatus cannot be performed.

9. The operation display apparatus according to claim 7, wherein the selection unit causes the user to select an image processing that is executed by the master display apparatus.

10. A control method for a display management system comprising:
- an operation display apparatus that performs image processing of an inputted image as necessary, and displays the processed image on a display unit;
- a master display apparatus that performs image processing of an inputted image as necessary, and displays the processed image on a display unit; and
- a management server, the control method comprising:
- a selection step in which the management server causes a user to select an image processing from a plurality of image processing executable by the master display apparatus; and
- an instruction step in which the management server instructs the operation display apparatus to execute the image processing selected in the selection step in a case where this image processing can be executed by the operation display apparatus, and the management server instructs the operation display apparatus to execute image processing substitutable for the image processing selected in the selection step in a case where the image processing selected in the selection step cannot be executed by the operation display apparatus, wherein
- the management server has a storage unit that stores first function information representing the plurality of image processing executable by the master display apparatus, second function information representing image processing executable by the operation display apparatus, and substitution information representing substitutable image processing for each image processing;
- in the selection step, the management server causes the user to select an image processing from the plurality of image processing represented by the first function information; and
- in the instruction step, the management server compares the image processing selected in the selection step and the second function information and determines whether or not the image processing selected in the selection step can be executed by the operation display apparatus; and
- determines the substitutable image processing by comparing the image processing selected in the selection step, the second function information, and the substitution information when the image processing selected in the selection step is determined to be unexecutable by the operation display apparatus.

11. The control method for a display management system according to claim 10, wherein when the image processing selected in the selection step and the image processing substitutable for this image processing cannot be executed by the operation display apparatus, in the instruction step, the management server instructs the operation display apparatus to display a warning to the effect that the display identical to that of the master display apparatus cannot be performed.

12. The control method for a display management system according to claim 10, wherein the selection step causes the user to select an image processing that is executed by the master display apparatus.

13. A control method for a display management system comprising:
- an operation display apparatus that performs image processing of an inputted image as necessary, and displays the processed image on a display unit; and
- a master display apparatus that performs image processing of an inputted image as necessary, and displays the processed image on a display unit, the control method comprising:
- a selection step in which the master display apparatus causes a user to select an image processing from a plurality of image processing executable by the master display apparatus; and
- an instruction step in which the master display apparatus instructs the operation display apparatus to execute the image processing selected in the selection step in a case where this image processing can be executed by the operation display apparatus, and instructs the operation display apparatus to execute image processing substitutable for the image processing selected in the selection step in a case where the image processing selected in the selection step cannot be executed by the operation display apparatus, wherein
- the master display apparatus has a storage unit that stores first function information representing the plurality of image processing executable by the master display apparatus, second function information representing image processing executable by the operation display apparatus, and substitution information representing substitutable image processing for each image processing;
- in the selection step, the master display apparatus causes the user to select an image processing from the plurality of image processing represented by the first function information; and
- in the instruction step, the master display apparatus compares the image processing selected in the selection step and the second function information and determines whether or not the image processing selected in the selection step can be executed by the operation display apparatus; and
- determines the substitutable image processing by comparing the image processing selected in the selection step, the second function information, and the substitution information when the image processing selected in the selection step is determined to be unexecutable by the operation display apparatus.

14. The control method for a display management system according to claim 13, wherein when the image processing selected in the selection step and the image processing substitutable for this image processing cannot be executed by the operation display apparatus, in the instruction step, the master display apparatus instructs the operation display apparatus to display a warning to the effect that the display identical to that of the master display apparatus cannot be performed.

15. The control method for a display management system according to claim 13, wherein the selection step causes the user to select an image processing that is executed by the master display apparatus.

16. A control method for an operation display apparatus that performs image processing of an inputted image as necessary, and displays the processed image on a display unit, the control method comprising:
- a selection step of causing a user to select an image processing from a plurality of image processing executable by a master display apparatus that performs image processing of an inputted image as necessary, and displays the processed image on a display unit;
- an image processing step of subjecting the inputted image to the image processing selected in the selection step in a case where this image processing can be executed by the operation display apparatus, and subjecting the inputted image to image processing substitutable for the image processing selected in the selection step in a case where the image processing selected in the selection step cannot be executed by the operation display apparatus; and a display control step of displaying on a display unit the image subjected to the image processing in the image processing step, wherein the operation display apparatus has a storage unit that stores first function information representing the plurality of image processing executable by the master display apparatus, second function information representing image processing executable by the operation display apparatus, and substitution information representing substitutable image processing for each image processing;

in the selection step, the user is caused to select an image processing from the plurality of image processing represented by the first function information; and in the image processing step, the image processing selected in the selection step and the second function information are compared and whether or not the image processing selected in the selection step can be executed by the operation display apparatus is determined; and the substitutable image processing is determined by comparing the image processing selected in the selection step, the second function information, and the substitution information when the image processing selected in the selection step is determined to be unexecutable by the operation display apparatus.

17. The control method for an operation display apparatus according to claim 16, wherein when the image processing selected in the selection step and the image processing substitutable for this image processing cannot be executed by the operation display apparatus, in the display step, a warning to the effect that the display identical to that of the master display apparatus cannot be performed is displayed.

18. The control method for an operation display apparatus according to claim 16, wherein the selection unit causes the user to select an image processing that is executed by the master display apparatus.

* * * * *